United States Patent
Okuda et al.

(10) Patent No.: US 9,382,690 B2
(45) Date of Patent: Jul. 5, 2016

(54) ENGINE SUPPORT MECHANISM WITH AFTERTREATMENT DEVICE

(71) Applicant: Komatsu Ltd., Tokyo (JP)

(72) Inventors: Kozo Okuda, Hirakata (JP); Tadashi Iijima, Yuuki (JP); Godo Ozawa, Utsunomiya (JP); Muneo Harada, Hitachinaka (JP); Naoto Ikeda, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/978,306

(22) PCT Filed: Nov. 19, 2012

(86) PCT No.: PCT/JP2012/079987
§ 371 (c)(1),
(2) Date: Jul. 3, 2013

(87) PCT Pub. No.: WO2014/054192
PCT Pub. Date: Apr. 10, 2014

(65) Prior Publication Data
US 2015/0211209 A1 Jul. 30, 2015

(30) Foreign Application Priority Data

Oct. 2, 2012 (JP) .................................. 2012-220805

(51) Int. Cl.
*E02F 9/08* (2006.01)
*B60K 13/04* (2006.01)
(Continued)

(52) U.S. Cl.
CPC ................ *E02F 9/0866* (2013.01); *B60K 5/12* (2013.01); *B60K 13/04* (2013.01); *F01N 3/035* (2013.01);
(Continued)

(58) Field of Classification Search
CPC .... E02F 9/0866; F01N 3/035; F01N 2590/08; F01N 13/1805; B60K 5/12; B60K 13/04; B60K 5/1208; B60K 5/1225; Y02T 10/20
See application file for complete search history.

(56) References Cited

U.S. PATENT DOCUMENTS 8,191,668 B2 * 6/2012 Keane et al. .................. 180/296
8,950,535 B2 * 2/2015 Harada et al. ................ 180/68.4
(Continued)

FOREIGN PATENT DOCUMENTS

JP      08-049535 A      2/1996
JP     2009-035111 A      2/2009
(Continued)

OTHER PUBLICATIONS

Office Action mailed May 12, 2014, issued for the German patent application No. 11 2012 002 667.5 and English translation thereof.
(Continued)

*Primary Examiner* — John Walters
*Assistant Examiner* — Brian Swenson
(74) *Attorney, Agent, or Firm* — Locke Lord LLP; James E. Armstrong, IV; Brian S. Matross

(57) ABSTRACT

An engine unit mounted to a vehicle frame, the engine unit includes: an engine; an engine support mechanism to be coupled to the vehicle frame, with at least one vibration absorbing mechanism disposed on each of both sides of the engine in an orthogonal direction to a crankshaft of the engine, to support the engine; an aftertreatment device to purify exhaust gas emitted from the engine; a base bracket provided to the engine support mechanism; and an upper bracket detachably fixed and mounted to the base bracket, the upper bracket supporting the aftertreatment device.

6 Claims, 13 Drawing Sheets

(51) Int. Cl.
*F01N 13/02* (2010.01)
*F01N 13/18* (2010.01)
*B60K 5/12* (2006.01)
*F01N 3/035* (2006.01)

(52) U.S. Cl.
CPC ............ *F01N 13/02* (2013.01); *F01N 13/1805* (2013.01); *F01N 2470/18* (2013.01); *F01N 2470/22* (2013.01)

(56) References Cited

U.S. PATENT DOCUMENTS

| | | | |
|---|---|---|---|
| 2008/0121451 A1* | 5/2008 | Kertz et al. | 180/69.24 |
| 2010/0122865 A1 | 5/2010 | Okada | |
| 2010/0218488 A1* | 9/2010 | Yokota | 60/297 |
| 2010/0275588 A1* | 11/2010 | Kamata et al. | 60/322 |
| 2011/0000199 A1 | 1/2011 | Ezawa et al. | |
| 2011/0030353 A1* | 2/2011 | Kamiya et al. | 60/297 |
| 2011/0120085 A1* | 5/2011 | Saito et al. | 60/272 |
| 2012/0227376 A1* | 9/2012 | Deyoung et al. | 60/272 |
| 2012/0247861 A1* | 10/2012 | Mizuno et al. | 180/296 |
| 2013/0213726 A1* | 8/2013 | Okada | 180/309 |

FOREIGN PATENT DOCUMENTS

| | | |
|---|---|---|
| JP | 2010-121562 A | 6/2010 |
| WO | WO-2010/004805 A1 | 1/2010 |

OTHER PUBLICATIONS

International Search Report mailed Feb. 19, 2013, issued for PCT/JP2012/079987.

* cited by examiner

ENGINE SUPPORT MECHANISM WITH AFTERTREATMENT DEVICE

FIELD

The present invention relates to an engine unit having an engine and an aftertreatment device.

BACKGROUND

In a construction machine such as an excavator, an engine such as a diesel engine is used as a drive source. Exhaust gas emitted from the engine includes nitrogen oxides and particulate matter. Therefore, among the construction machines, there is one provided with an engine unit having an engine and an aftertreatment device for removing the nitrogen oxides and particulate matter included in the exhaust gas.

Disclosed in Patent Literature 1 is a muffler formed by connecting an exhaust gas purification device and a muffler device, the exhaust gas purification device serving as an aftertreatment device for removing NOx (nitrogen oxides) and PM (particulate matter) from the exhaust gas. A muffler mount mounted with the muffler is mounted, with bolts, to mount brackets for supporting the engine in such a manner as to astride a hydraulic pump.

CITATION LIST

Patent Literature

Patent Literature 1: Japanese Laid-open Patent Publication No. 2010-121562

SUMMARY

Technical Problem

In the device described in Patent Literature 1, because the muffler mount for supporting the aftertreatment device is mounted to the mount brackets mounted to a mainframe of a swinging superstructure to support the engine, the aftertreatment device and the engine supported on the mount brackets with vibration absorbing rubber or the like belong to different vibration systems. Therefore, a pipe for sending exhaust gas from the engine to the aftertreatment device connects the different vibration systems, which results in a load on the pipe. The load on a part of the piping may cause a failure, which may reduce durability of the engine unit.

The invention has been made with the above-described circumstances in view and its object is to provide an engine unit with improved durability of the device.

Solution to Problem

To overcome the problems and achieve the object, according to the present invention, an engine unit mounted to a vehicle frame, the engine unit comprises: an engine; an aftertreatment device to purify exhaust gas emitted from the engine; an engine support mechanism to be coupled to the vehicle frame, with vibration absorbing mechanisms respectively disposed on both sides of the engine in an orthogonal direction to a crankshaft of the engine and on a side of the aftertreatment device, to support the engine; a base bracket provided to the engine support mechanism; and an upper bracket detachably fixed and mounted to the base bracket, the upper bracket supporting the aftertreatment device, wherein the base bracket has a base frame which extends in such a direction from a side of the engine support mechanism toward the upper bracket, and away from the engine in a parallel direction to a rotation central axis of the crankshaft of the engine, and which is supported on one end by the engine support mechanism.

In the present invention, it is preferable that the base bracket is fixed to both of the engine and the engine support mechanism.

In the present invention, it is preferable that the engine support mechanism has an engine mount mounted to the engine and coupled to the vehicle frame with the vibration absorbing mechanisms, and the base bracket is fixed to the engine mount.

In the present invention, it is preferable that the engine support mechanism has an engine mount mounted to the engine and coupled to the vehicle frame with the vibration absorbing mechanisms, and the base bracket includes the engine mount.

In the present invention, it is preferable that a pipe of the aftertreatment device coupled to the engine, the pipe guiding the exhaust gas emitted from the engine, has a mechanism for absorbing a displacement due to a vibration.

In the present invention, it is preferable that the aftertreatment device includes a first treatment section for collecting particulate matter included in the exhaust gas and a second treatment section for reducing nitrogen oxides included in the exhaust gas.

In the present invention, it is preferable that the second treatment section is disposed on an upper side of the first treatment section in a vertical direction.

Advantageous Effects of Invention

With the engine unit according to the invention, it is possible to improve durability of the device.

DESCRIPTION OF EMBODIMENT

The present invention will be described below in detail with reference to the drawings. The invention is not restricted by the following mode for carrying out the invention (hereafter referred to as "embodiment"). Components in the following embodiment include those which are easy for a person skilled in the art to conceive, those which are substantially similar, and those which are in what is called an equivalent scope. Moreover, the components disclosed in the following embodiment can be suitably combined with each other.

Figure 1:
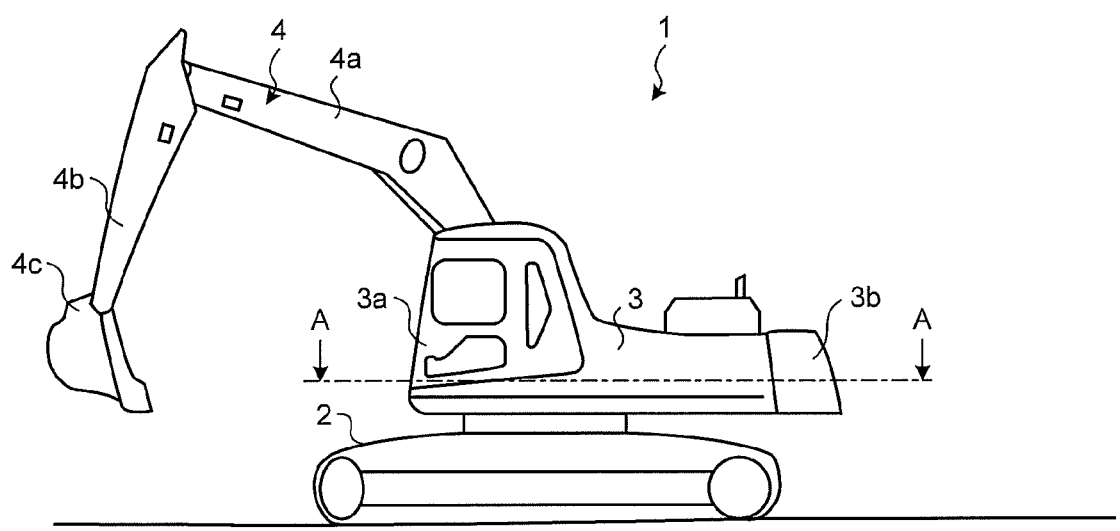
FIG. 1 is a side view illustrating a schematic structure of an excavator.

FIG. 1 is a side view illustrating a schematic structure of an excavator. An excavator 1 in the embodiment includes a pair of right and left crawler belts 2 forming a traveling undercarriage, a swinging superstructure 3 having a cabin 3a, a counterweight 3b, and the like and disposed on the crawler belts 2, and a working machine 4 formed by a boom 4a, an arm 4b, and a bucket 4c and mounted to the swinging superstructure 3. As will be described later in detail, an engine unit 20 in the embodiment is mounted in the swinging superstructure 3. The pair of right and left crawler belts 2 is actuated by driving of a right traveling motor and a left traveling motor and moves forward or backward while traveling straight or turning. The swinging superstructure 3 is caused by driving of a swinging motor to rotate in a horizontal plane with respect to the crawler belts 2 so as to direct the working machine 4 into an arbitrary direction. The boom 4a, the arm 4b, and the bucket 4c are actuated by driving of hydraulic cylinders and the like for the boom 4a, the arm 4b, and the bucket 4c, respectively, to carry out desired work such as excavation. The right traveling motor, the left traveling motor, the swinging motor, the hydraulic cylinders, and the like are driven by hydraulic pressure generated by a hydraulic pump 28 driven by an engine 22 (described later).

Figure 2:
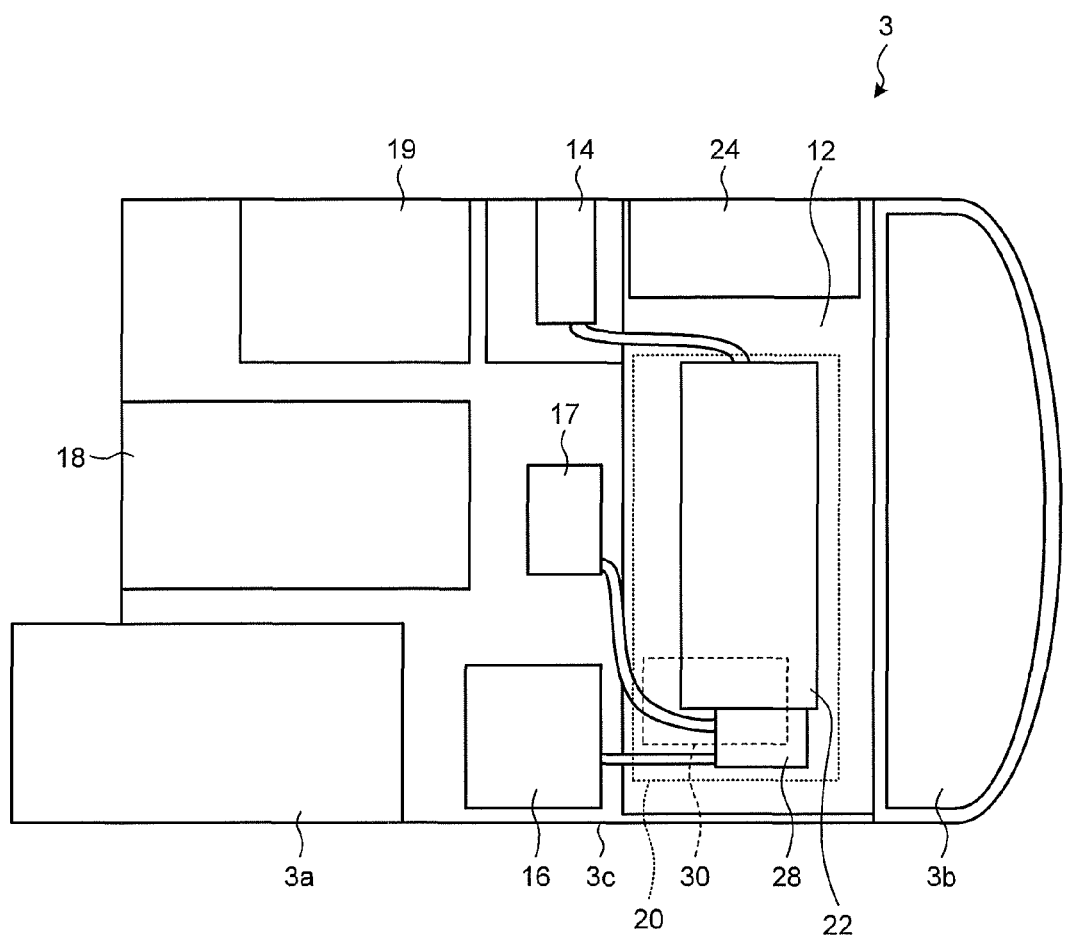
FIG. 2 is a view of the excavator illustrated in FIG. 1, taken along line A-A, and seen in a direction of arrows.

Next, positions of the engine unit 20 and other respective portions disposed in the swinging superstructure 3 will be described. FIG. 2 is a view of the excavator illustrated in FIG. 1, taken along line A-A, and seen in a direction of arrows. FIG. 2 schematically illustrates positional relationships between the respective portions of the swinging superstructure 3. Here, the swinging superstructure 3 is in a substantially rectangular shape, the cabin 3a is disposed in one of four corners of the rectangle, and the counterweight 3b is disposed along a shorter side of the rectangle where the cabin 3a is not disposed. In the view along line A-A and seen in the direction of the arrows, the swinging superstructure 3 includes, in addition to the cabin 3a and the counterweight 3b, an engine room 12 where the engine unit 20 and a cooling system 24 are disposed, an intake system 14, a hydraulic oil tank 16, a hydraulic machine section 17, a working machine base section 18, and a fuel tank 19. These respective portions of the swinging superstructure 3 are supported by a vehicle frame 3c serving as a housing.

The engine room 12 is disposed to be adjacent to the counterweight 3b. In other words, the engine room 12 is on a side of the cabin 3a of the counterweight 3b. In the engine room 12, the engine unit 20 and the cooling system 24 are disposed. The engine unit 20 includes the engine 22, the hydraulic pump 28, and an aftertreatment device 30. The engine unit 20 will be described later.

The cooling system 24 circulates coolant such as water between the engine 22 and itself to carry out heat exchange between passing-through air and warmed coolant to thereby cool the engine 22. The cooling system 24 includes a ventilating space communicating with an outside and an air blowing section and the air blowing section generates a flow of air by sending outside air, taken in from the ventilating space, into the engine room 12.

The intake system 14 is a device for supplying air to the engine unit 20 and disposed to be adjacent to the engine room 12. To put it concretely, the intake system 14 is disposed at an end portion on a side where the cooling system 24 is disposed and on an opposite side from a face opposed to the counterweight 3b. The intake system 14 includes an air pipe for connecting the outside and the engine 22 and supplies the air, taken from the outside, into the engine 22 through the air pipe.

Next, the hydraulic oil tank 16 is a tank for supplying hydraulic oil to the hydraulic pump 28 in the engine unit 20 and retrieving the hydraulic oil used by the working machine and the like. The hydraulic oil tank 16 is disposed between the engine room 12 and the cabin 3a.

The hydraulic machine section 17 is a device for supplying the hydraulic oil, pressurized by the hydraulic pump 28, to the working machine and the like to be driven by the pressurized hydraulic oil and is disposed in an area surrounded with the engine room 12, the hydraulic oil tank 16, and the intake system 14, i.e., near a center of the swinging superstructure 3.

The working machine base section 18 is a portion for mounting the working machine 4 to the swinging superstructure 3 and is disposed along a side opposed to a side, along which the counterweight 3b is disposed, and in a position adjacent to the cabin 3a. The working machine 4 is formed to extend the bucket 4c in a direction opposite from the counterweight 3b.

The fuel tank 19 is a tank for storing fuel to be burned in the engine unit 20 in the engine room 12 and is disposed to be adjacent to a face of the working machine base section 18 opposite from the cabin 3a. The fuel tank 19 is adjacent to the intake system 14.

As illustrated in FIG. 2, around the engine room 12 of the swinging superstructure 3, the counterweight 3b, the intake system 14, the hydraulic oil tank 16, and the hydraulic machine section 17 are disposed. Around the intake system 14, the hydraulic oil tank 16, and the hydraulic machine section 17, the cabin 3a, the working machine base section 18, and the fuel tank 19 are disposed to be adjacent to them. In the engine room 12, the cooling system 24 is disposed besides the engine unit 20. Therefore, there is a certain restriction on an area where the engine unit 20 can be disposed.

Figure 3:
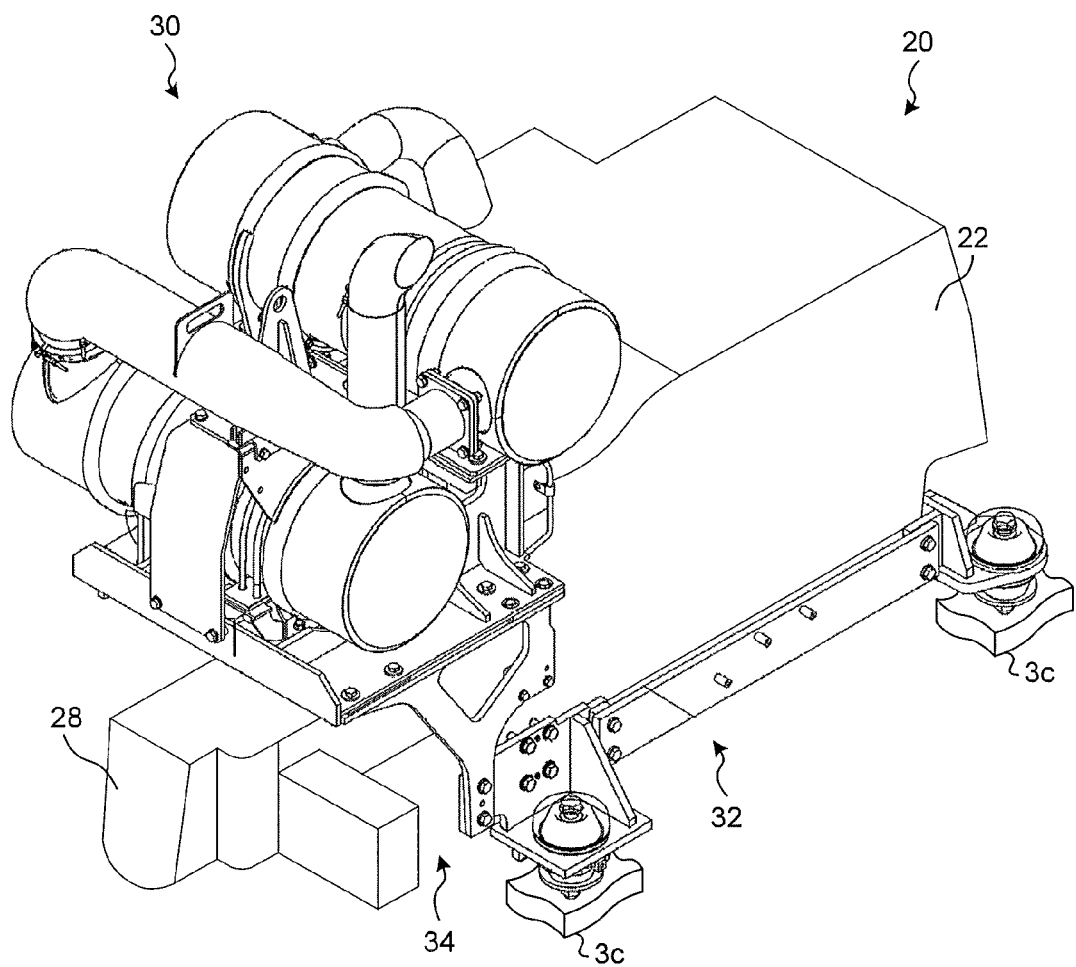
FIG. 3 is a perspective view illustrating a schematic structure of an engine unit illustrated in FIG. 2.
Figure 4:
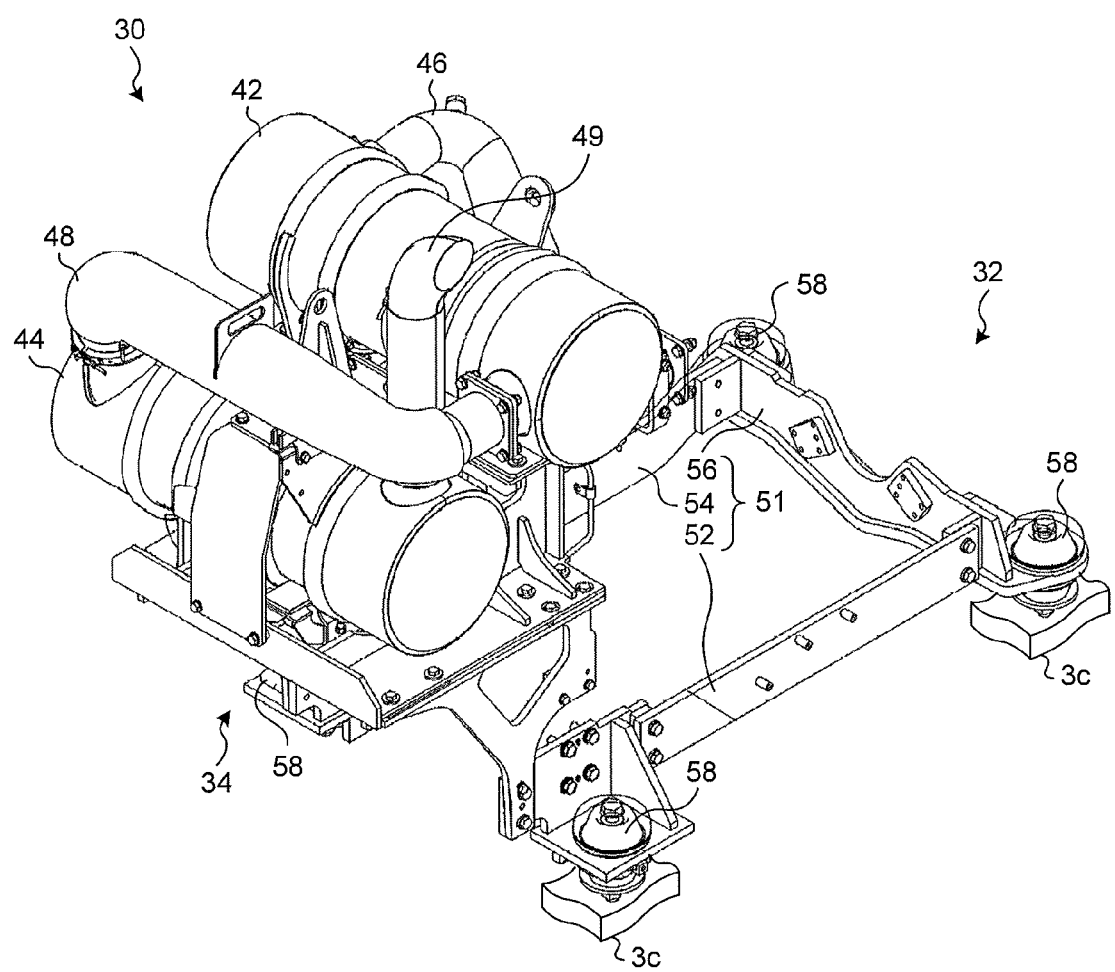
FIG. 4 is a perspective view illustrating schematic structures of an aftertreatment device, an engine support mechanism, and a mount mechanism illustrated in FIG. 3.
Figure 5:
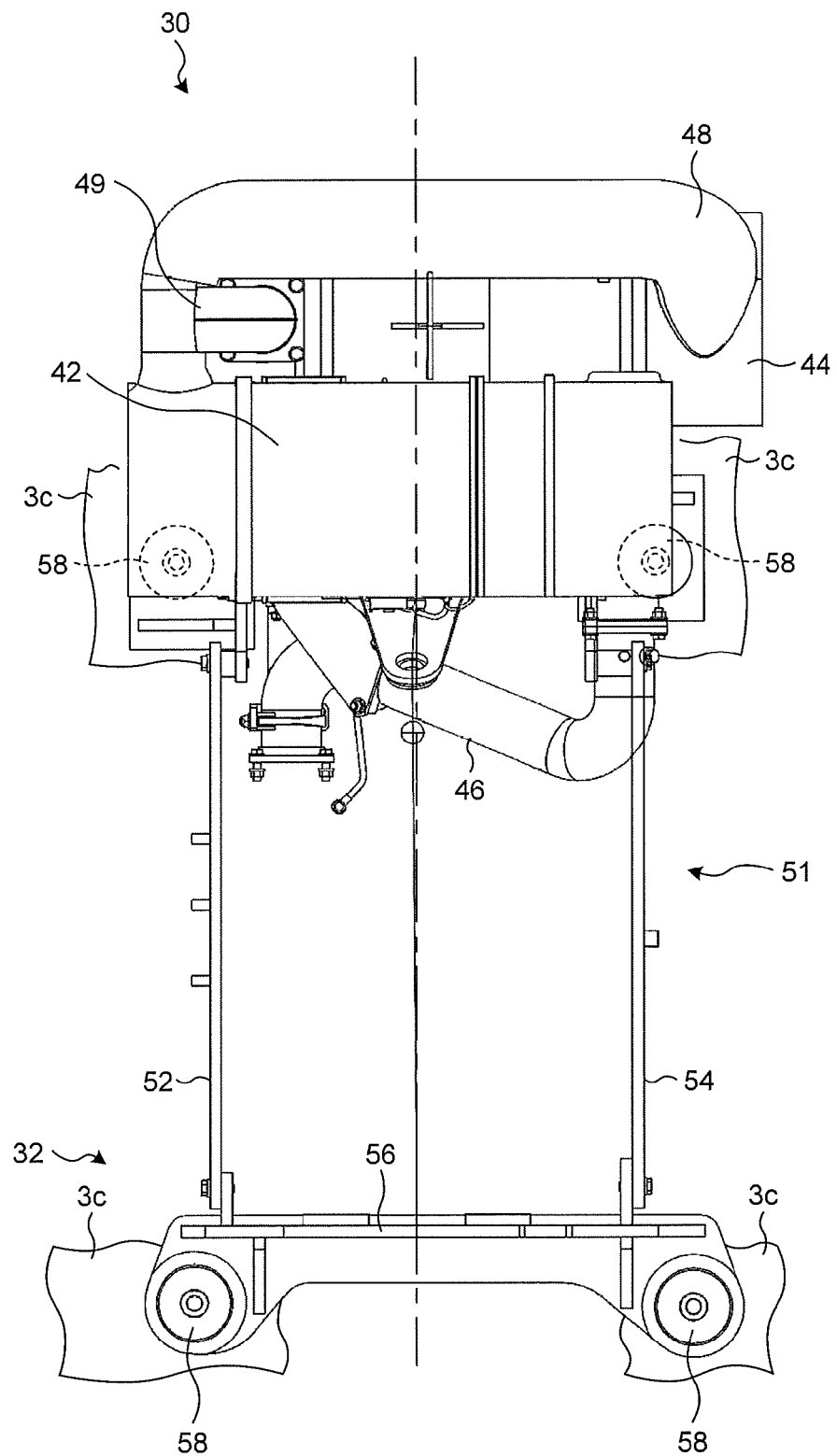
FIG. 5 is a top view of the aftertreatment device, the engine support mechanism, and the mount mechanism illustrated in FIG. 4.
Figure 6:
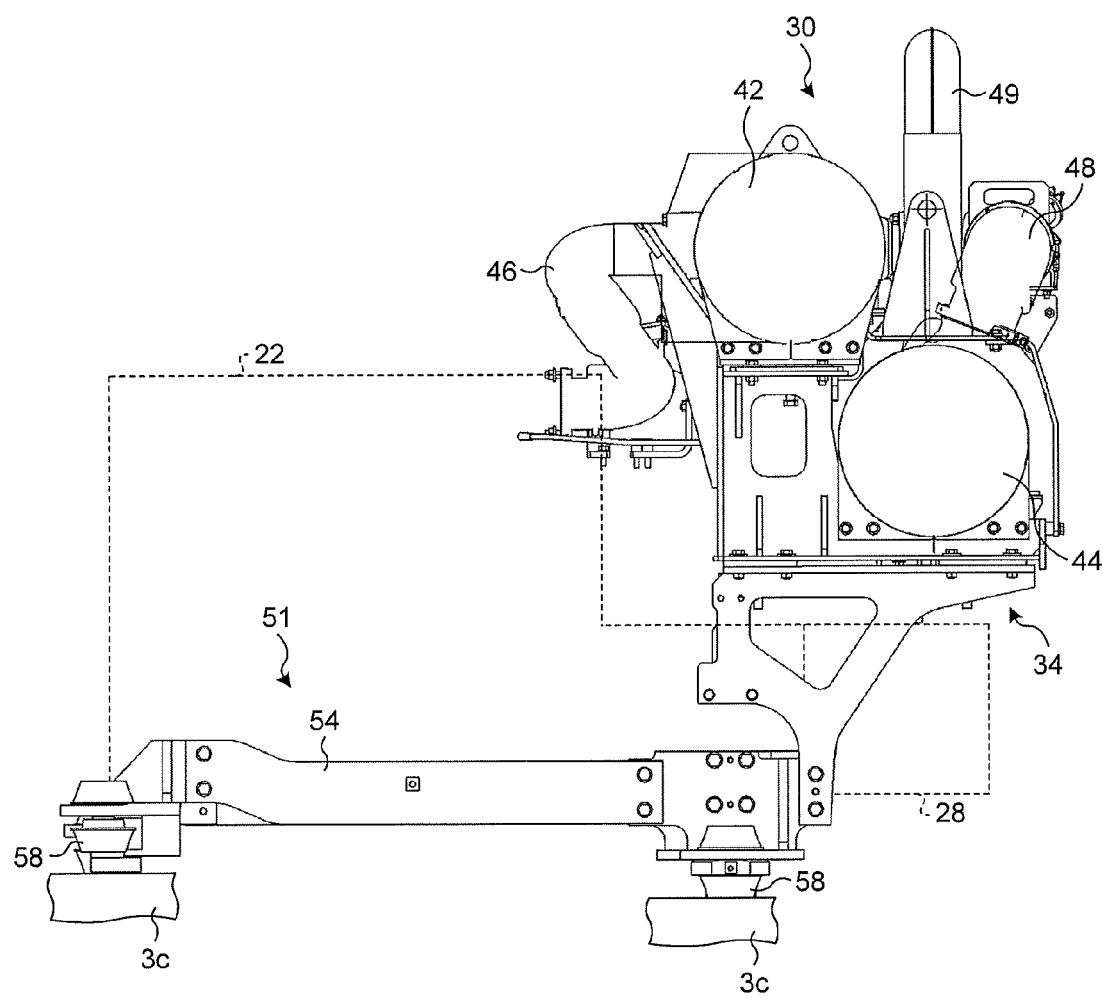
FIG. 6 is a side view of the aftertreatment device, the engine support mechanism, and the mount mechanism illustrated in FIG. 4.
Figure 7:
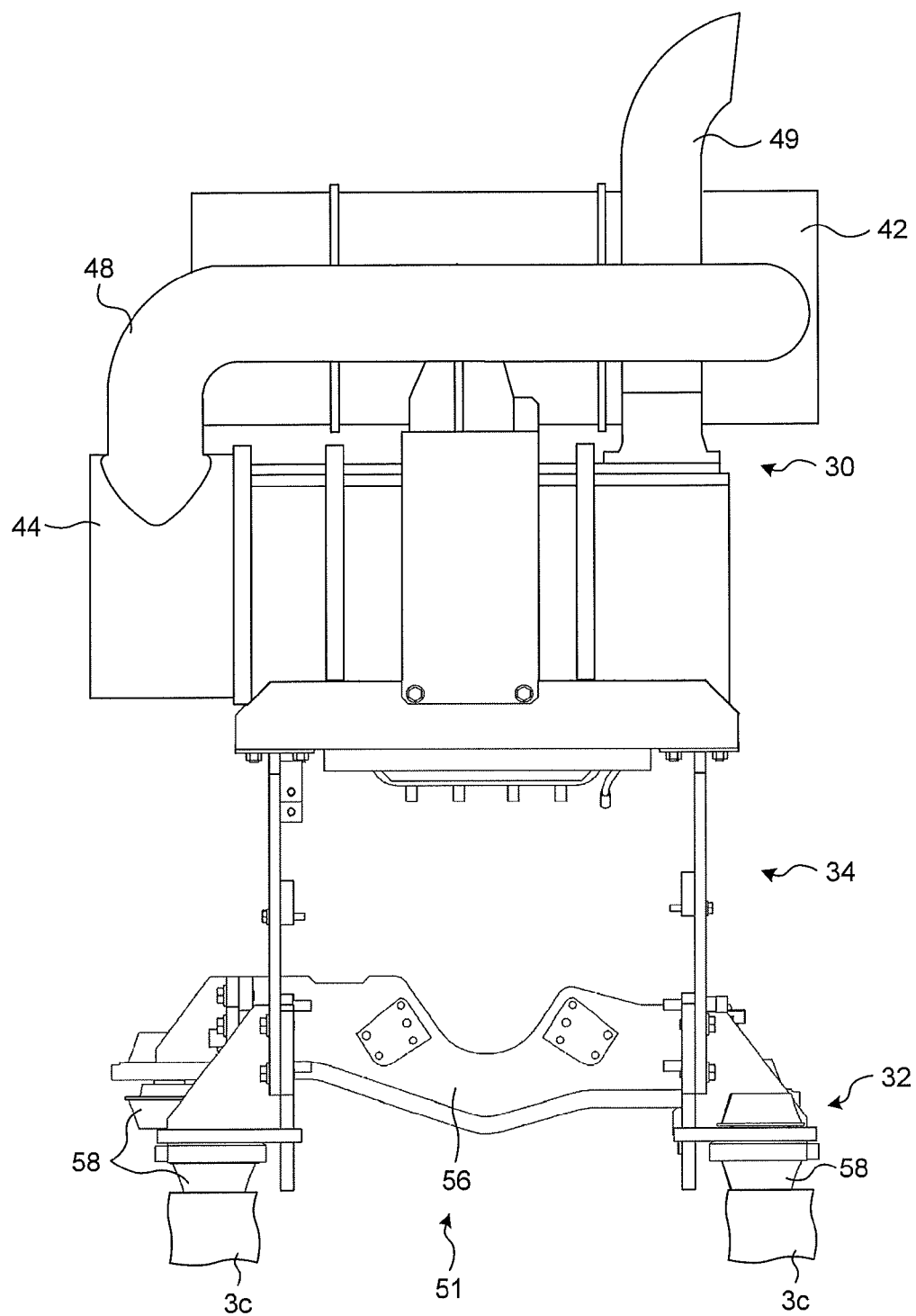
FIG. 7 is a back view of the aftertreatment device, the engine support mechanism, and the mount mechanism illustrated in FIG. 4.

Next, the engine unit 20 will be described by using FIGS. 3 to 9. Here, FIG. 3 is a perspective view illustrating a schematic structure of the engine unit. FIG. 4 is a perspective view illustrating the aftertreatment device, an engine support mechanism, and a mount mechanism illustrated in FIG. 3. FIG. 5 is a top view of the aftertreatment device, the engine support mechanism, and the mount mechanism illustrated in FIG. 4. FIG. 6 is a side view of the aftertreatment device, the engine support mechanism, and the mount mechanism illustrated in FIG. 4. FIG. 7 is a back view of the aftertreatment device, the engine support mechanism, and the mount mechanism illustrated in FIG. 4. FIGS. 3 to 7 illustrate only a part of the vehicle frame 3c of the swinging superstructure 3. As illustrated in FIG. 3, the engine unit 20 includes the engine 22, the hydraulic pump 28, the aftertreatment device 30, an engine support mechanism 32, and a mount mechanism 34.

The engine 22 is a diesel engine and serves as a drive source for driving the hydraulic pump 28. The engine 22 generates drive force by burning the fuel, supplied from the fuel tank 19, by using the air supplied from the intake system 14.

The hydraulic pump 28 is a hydraulic pressure generating mechanism to be driven by the engine 22 to thereby pressurize the hydraulic oil and is mounted to one end portion (concretely, the end portion opposite from the side where the cooling system 24 is disposed) in a longitudinal direction (direction of a crankshaft) of the engine 22. The hydraulic pump 28 pressurizes the hydraulic oil supplied from the hydraulic oil tank 16 to thereby generate the hydraulic pressure. The pressurized hydraulic oil is supplied from the hydraulic machine section 17 to the respective portions.

Next, the aftertreatment device 30 is a purification device for purifying exhaust gas generated in the engine 22 and is disposed on an upper side in a vertical direction of (in the embodiment, immediately above) the hydraulic pump 28. By disposing the aftertreatment device 30 above the hydraulic pump 28, it is possible to efficiently dispose the respective portions of the engine unit 20. In other words, it is possible to reduce a space required for installing the engine unit 20.

The aftertreatment device 30 mainly includes a DPF (Diesel Particulate Filter) and an SCR (Selective Catalytic Reduction). As illustrated in FIGS. 4 to 7, the aftertreatment device 30 includes a first treatment section 42 which is the DPF, a second treatment section 44 which is the SCR, a first pipe 46, a second pipe 48, and an exhaust pipe 49. The first treatment section 42 and the second treatment section 44 are in substantially cylindrical shapes. The first treatment section 42 is disposed at a position higher and closer to the engine 22 than the second treatment section 44. The first treatment section 42 and the second treatment section 44 are disposed so that their longitudinal directions are perpendicular to the crankshaft of the engine 22. The first pipe 46 is a duct for connecting an exhaust manifold of the engine 22 and the first treatment section 42. The second pipe 48 is a duct for connecting the first treatment section 42 and the second treatment section 44. The exhaust pipe 49 has one end connected to the second treatment section 44 and the other end open into outside air. In this way, the aftertreatment device 30 causes the exhaust gas, emitted from the engine 22, to pass through the first pipe 46, the first treatment section 42, the second pipe 48, the second treatment section 44, and the exhaust pipe 49 in this order and emits it to the outside air. The first pipe 46 and the second pipe 48 are formed by ducts at least parts of which are flexible areas (portions) such as bellows.

The first treatment section 42 is a dust collecting device for collecting PM (Particulate Matter) included in the exhaust gas. The first treatment section 42 is the DPF and is formed by an oxidation catalyst and a soot filter coated with an oxidation catalyst to collect the PM. The first treatment section 42 oxidizes nitrogen monoxide in the exhaust gas to produce nitrogen dioxide. The nitrogen dioxide is unstable in a high-temperature atmosphere such as exhaust gas and releases oxygen to turn into nitrogen monoxide again. Due to oxidation power of the oxidation catalyst and released oxygen, the PM collected by the soot filter burns. Nitrogen monoxide and remaining nitrogen dioxide are sent to the second treatment section 44 through the second pipe 48. As material of the soot filter, ceramic such as cordierite and silicon carbide or metal such as stainless steel and aluminum is used.

A reducing substance producing section is provided to the second pipe 48. The reducing substance producing section decomposes a reducing agent, supplied from a reducing agent supply device provided separately, to produce a reducing substance. Urea water is supplied as the reducing agent to the reducing agent producing section in the embodiment and the reducing agent producing section decomposes urea included in the supplied urea water to produce ammonia which is the reducing substance. The reducing substance (ammonia, in the embodiment) produced in the reducing substance producing section passes through the second pipe 48 and is supplied to the second treatment section 44 together with the exhaust gas.

The second treatment section 44 is a denitration device (reducing device) for reducing nitrogen oxides included in the exhaust gas. To put it concretely, the second treatment section 44 is an SCR (reaction section) disposed from an upstream side toward a downstream side in a flowing direction of the exhaust gas. In other words, the second treatment section 44 is an SCR-type catalyst converter and includes a urea denitration catalyst (DeNOx catalyst) made of base metal such as zeolite and vanadium. The urea denitration catalyst reacts ammonia, produced by the reducing substance producing section, with NOx in the exhaust gas and decomposes NOx into nitrogen and oxygen for purification. The aftertreatment device 30 includes an oxidation treatment section on a downstream side of the second treatment section 44 in the flowing direction of the exhaust gas. The oxidation treatment section has an oxidation catalyst and detoxifies ammonia remaining in the second treatment section 44 by oxidizing and decomposing ammonia into nitrogen and water. The exhaust gas treated in the oxidation treatment section is emitted outside through the exhaust pipe 49.

Next, the engine support mechanism 32 will be described. The engine support mechanism 32 is the support mechanism for supporting the engine 22 and coupled to the vehicle frame 3c of the swinging superstructure 3 with vibration absorbing mechanisms 58 interposed therebetween. The engine support mechanism 32 directly or indirectly supports the respective portions of the engine unit 20, i.e., the hydraulic pump 28, the aftertreatment device 30, and the mount mechanism 34. The engine support mechanism 32 includes a frame unit 51. The frame unit 51 has support frames 52 and 54 and an auxiliary frame 56. In the following description, for convenience of explanation, a side of the engine 22 mounted with the hydraulic pump 28 will be referred to as an engine rear side and an opposite side of the engine 22 from the side mounted with the hydraulic pump 28 will be referred to as an engine front side. These names are for convenience in the embodiment and the engine front side and the engine rear side are not limited to these definitions.

The support frame 52 is disposed below the engine 22 to face one side face of an outer periphery of the engine 22 in the direction of the crankshaft. The support frame 54 is disposed below the engine 22 to face the other side face of the outer periphery of the engine 22 in the direction of the crankshaft, i.e., the opposite side face from the support frame 52. The support frames 52 and 54 have one ends disposed on the engine rear side near the hydraulic pump 28 and the other end portions disposed on the engine front side away from the hydraulic pump 28. The support frames 52 and 54 are coupled to the engine 22 by fastening members such as bolts.

The auxiliary frame 56 is disposed on the engine front side. The auxiliary frame 56 couples the support frame 52 and the support frame 54. In this way, the support frame 52, the support frame 54, and the auxiliary frame 56 form the single coupled frame unit 51 and faces three sides (excluding one side along which the hydraulic pump 28 is disposed) out of four sides of a rectangular shape of the engine 22 when a shape of the engine 22 seen from above is regarded as the rectangle.

The vibration absorbing mechanisms 58 are coupling members for coupling the frame unit 51 and the vehicle frame 3c. Each of the vibration absorbing mechanisms 58 has a mechanism such as vibration absorbing rubber for damping vibration, damps vibration transmitted from the vehicle frame 3c to the frame unit 51, and damps vibration transmitted from the frame unit 51 to the vehicle frame 3c. The vibration absorbing mechanisms 58 are provided at four positions of the frame unit 51 and respectively couple the frame unit 51 at four corners of the rectangular shape of the engine 22 when the shape of the engine 22 seen from above is regarded as the rectangle, i.e., four positions: an end portion of the support frame 52 on a side of the hydraulic pump 28; an end portion of the support frame 54 on a side of the hydraulic pump 28; a connection between the support frame 52 and the auxiliary frame 56; and a connection between the support frame 54 and the auxiliary frame 56.

Figure 8:
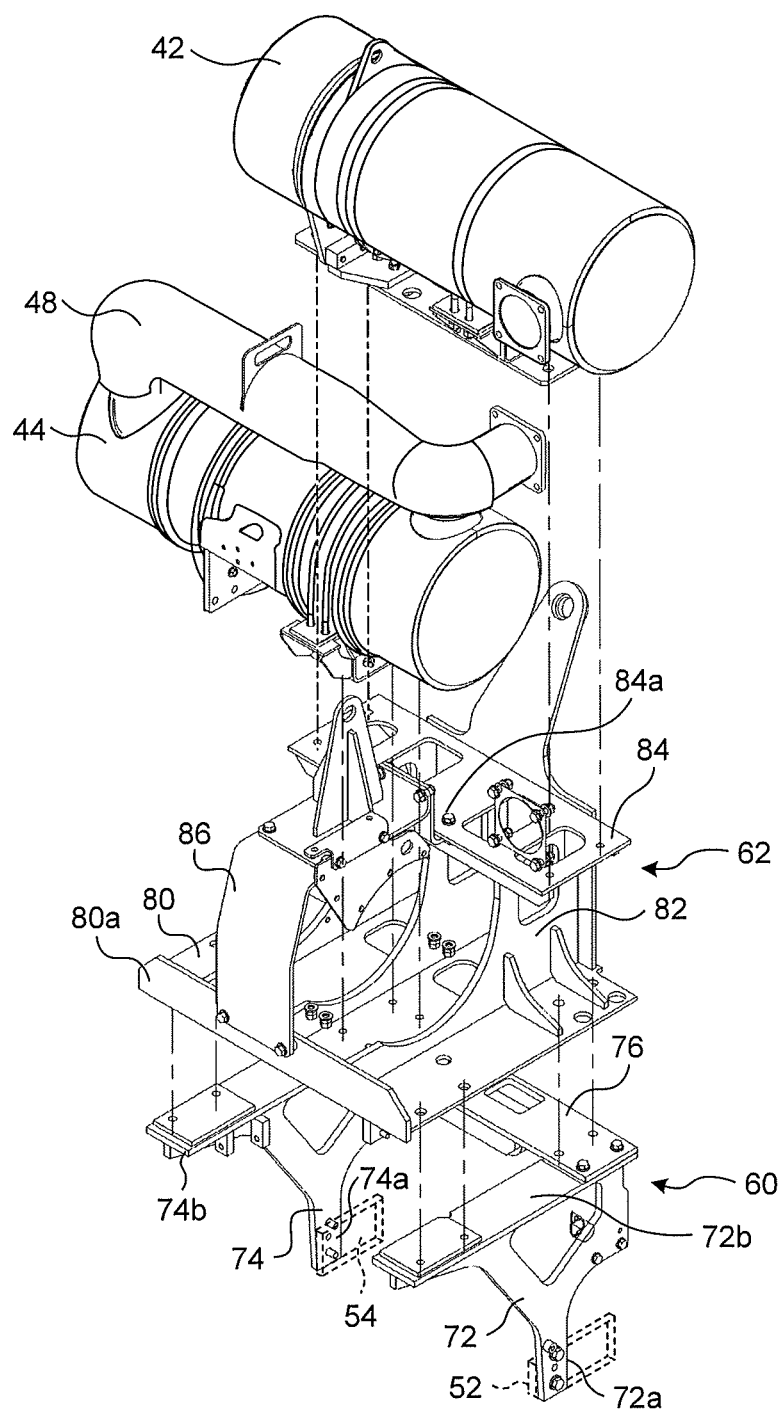
FIG. 8 is a perspective view illustrating schematic structures of the mount mechanism and the aftertreatment device illustrated in FIG. 4.
Figure 9:
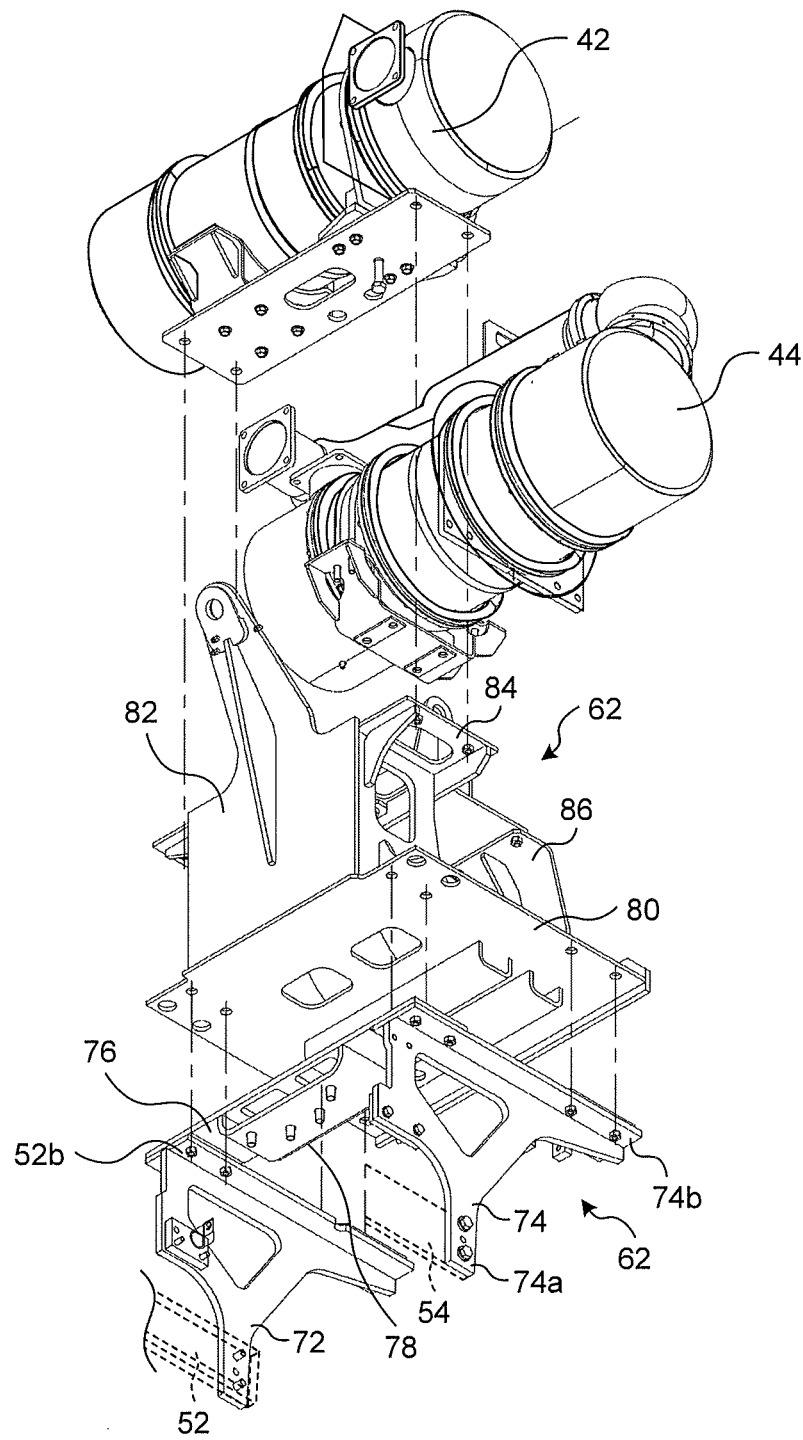
FIG. 9 is a perspective view illustrating the schematic structures of the mount mechanism and the aftertreatment device, illustrated in FIG. 4, in an opposite direction from FIG. 8.
Figure 10:
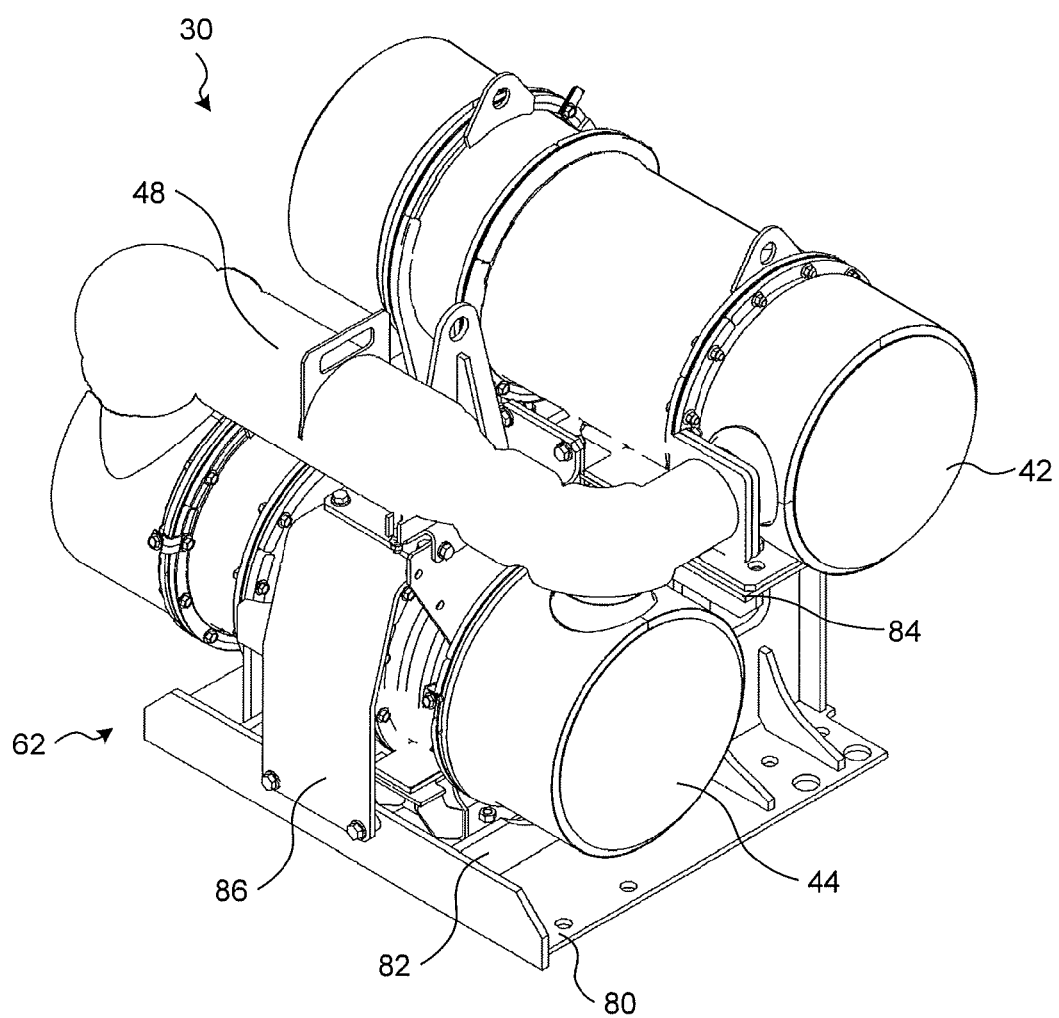
FIG. 10 is a perspective view illustrating a schematic structure of an assembly formed by assembling an upper bracket and the aftertreatment device.

The mount mechanism 34 is the support mechanism, which is disposed around the hydraulic pump 28 and parts of which are coupled to the engine 22 and the engine support mechanism 32, and supports the aftertreatment device 30. By using FIGS. 3, 4, and 8 to 10, the mount mechanism 34 will be described. FIG. 8 is a perspective view illustrating schematic structures of the mount mechanism and the aftertreatment device illustrated in FIG. 4. FIG. 9 is a perspective view illustrating the schematic structures of the mount mechanism and the aftertreatment device, illustrated in FIG. 4, in an opposite direction from FIG. 8. FIG. 10 is a perspective view illustrating a schematic structure of an assembly formed by assembling an upper bracket and the aftertreatment device. FIGS. 8 and 9 illustrate only parts of the support frames 52 and 54. As illustrated in FIGS. 3 and 4, the mount mechanism 34 is coupled to the engine 22 and the engine support mechanism 32 and supports the aftertreatment device 30 in a position above the hydraulic pump 28. As illustrated in FIGS. 8 and 9, the mount mechanism 34 has a base bracket 60 and an upper bracket 62.

The base bracket 60 is a structure coupled to the engine 22 and the engine support mechanism 32 to support the upper bracket 62 and includes base frames 72 and 74 and a coupling frame 76.

The base frame 72 is formed by a member having a plate-shaped face opposed to the hydraulic pump 28 and stretching in a vertical direction and a fastening portion 72a formed at a lower end portion in a vertical direction and a member having a flange 72b formed at an upper end portion in the vertical direction. The base frame 72 is the plate-shaped member stretching in the vertical direction and in a Y shape bifurcated on a side of the flange 72b. The two branches of the Y shape extend away from each other in a direction parallel to the crankshaft direction of the engine 22 as they extend upward in the vertical direction. The fastening portion 72a is the portion for fastening (fixing) the base frame 72 to the support frame 52 by fastening bolts or the like. The flange 72b is in a plate shape stretching in a horizontal direction and in a rectangular shape long in the crankshaft direction of the engine 22.

The base frame 74 has a similar basic structure to the base frame 72 except that a fastening portion 74a is fastened to the support frame 54 and that the base frame 74 faces an opposite face of the hydraulic pump 28 from the face facing the base frame 72.

The coupling frame 76 is a long and narrow plate-shaped member and has one end portion in a longitudinal direction coupled to an end portion of the flange 72b of the base frame 72 on a side of the engine 22 and the other end portion coupled to an end portion of a flange 74b of the base frame 74 on a side of the engine 22. The coupling frame 76 couples the flange 72b and the flange 74b from above in the vertical direction. The coupling frame 76 is provided with an engine coupling portion 78 (see FIG. 9) to be coupled to the engine 22. By coupling the engine coupling portion 78 to the engine 22 by fastening bolts, the coupling frame 76 is fixed to the engine 22.

By coupling the flange 72b of the base frame 72 and the flange 74b of the base frame 74 with the coupling frame 76, an angular-U-shaped face (a rectangular shape without a side) is formed above the hydraulic pump 28. In the embodiment, a protruding portion to be at the same height as the coupling frame 76 in the vertical direction is provided to at least a portion of an upper face of each of the flange 72b and the flange 74b not in contact with the coupling frame 76.

With the above structure, the base bracket 60 forms the angular-U-shaped face formed by the members fixed to the engine support mechanism 32 and the engine 22 above the hydraulic pump 28. The angular U-shaped face formed above the hydraulic pump 28 by the base bracket 60 is formed along an outer periphery of the hydraulic pump 28. Because the base bracket 60 is fixed to the engine support mechanism 32 and the engine 22 by fastening the bolts or the like, the base bracket 60 belongs to the same vibration system as the engine support mechanism 32 and the engine 22.

The upper bracket 62 is the support mechanism for supporting respective portions of the aftertreatment device 30 and is detachably fixed to the base bracket 60 by fastening bolts or the like. The upper bracket 62 includes a support panel 80, a first support frame 82, a second support frame 84, and a fixing frame 86.

The support panel 80 is a plate-shaped member and serves as a base of the upper bracket 62. A lower face (a face on a lower side in the vertical direction) of the support panel 80 comes in contact with the angular-U-shaped face formed by the flange 72b of the base frame 72, the flange 74b of the base frame 74, and the coupling frame 76 of the base bracket 60. The support panel 80 is a plate-shaped member for covering an entire face of the rectangular shape formed by adding the missing side to the angular-U-shape formed by the flange 72b of the base frame 72, the flange 74b of the base frame 74, and the coupling frame 76 and does not basically have an opening other than bolt holes, ventilating holes, and lightening portions for weight reduction. The support panel 80 is fastened to the angular-U-shaped face formed by the flange 72b of the base frame 72, the flange 74b of the base frame 74, and the coupling frame 76 by fastening bolts or the like.

The first support frame 82 is a support mechanism for supporting the second treatment section 44 and is provided to an upper face (a face on an upper side in the vertical direction) of the support panel 80. The first support frame 82 has a support portion along an outer peripheral shape of the second treatment section 44 and supports the second treatment section 44 by bringing the support portion into contact with an outer peripheral face of the second treatment section 44.

The second support frame 84 is a support mechanism for supporting the first treatment section 42 and is provided to an upper face of the first support frame 82. The second support frame 84 has a plate-shaped member which comes in contact with a plate-shaped member provided to a lower face of the first treatment section 42. By fixing the two plate-shaped members in contact with each other by fastening bolts or the like, the second support frame 84 supports and fix the first treatment section 42.

The fixing frame 86 is a fixing mechanism for fixing the second treatment section 44, supported by the first support frame 82, to the first support frame 82. The fixing frame 86 is disposed to cover an area of an outer peripheral face of the second treatment section 44 and not facing the first support frame 82 in a circumferential direction of the second treatment section 44. The fixing frame 86 is fastened, by bolts, to an end portion 84a of the second support frame 84 on a side of the second treatment section 44 and fastened, by bolts, to a portion 80a of an end portion of the support panel 80 and bent to a side of the second support frame 84 (see FIG. 8). In this way, the fixing frame 86 is coupled to the first support frame 82 with the support panel 80 and the second support frame 84 interposed therebetween. As a result, an entire circumference of the second treatment section 44 in the circumferential direction is covered with the first support frame 82 and the fixing frame 86 coupled to each other and the second treatment section 44 cannot be detached from the first support frame 82 and the fixing frame 86. A method of fixing the fixing frame 86 to the other members is not limited to fastening by bolts.

The upper bracket 62 supports the second treatment section 44 with the first support frame 82 and the fixing frame 86 provided onto the support panel 80 and supports the first treatment section 42 with the second support frame 84. The second pipe 48 is supported by the first treatment section 42 and the second treatment section 44 and the exhaust pipe 49 is supported by the second treatment section 44. In this way, as illustrated in FIG. 10, the upper bracket 62 supports the respective portions of the aftertreatment device 30 to become an assembly. The first pipe 46 is supported by the first treatment section 42 and the engine 22.

In this manner, the upper bracket 62 for supporting the aftertreatment device 30 is fastened, by bolts, to the angular-U-shaped face formed by the support panel 80, the flange 72b of the base frame 72, the flange 74b of the base frame 74, and the coupling frame 76 to thereby be fixed to the base bracket 60.

In the engine unit 20, by supporting the mount mechanism 34 for supporting the aftertreatment device 30 by the engine 22 and the engine support mechanism 32, the engine 22 and the aftertreatment device 30 belong to the same vibration system. In this way, it is possible to suppress occurrence of a vibration phase shift between the engine 22 and the aftertreatment device 30 to thereby reduce a load applied on the first pipe 46 connecting the engine 22 and the aftertreatment device 30. In other words, in a structure with a vibration absorbing mechanism disposed between the engine 22 and the aftertreatment device 30, the engine 22 and the aftertreatment device 30 belong to different vibration systems and vibrations of the engine 22 and the aftertreatment device 30 are out of phase with each other, which increases a relative displacement between positions of opposite ends of the first pipe 46. If the relative displacement increases, the load applied on the first pipe 46 increases. On the other hand, in the engine unit 20, because the vibration absorbing mechanism is not disposed between the engine 22 and the aftertreatment device 30 and the members between the engine 22 and the aftertreatment device 30 are fixed, the engine 22 and the aftertreatment device 30 belong to the same vibration system and vibrate together and the relative displacement between positions of the opposite ends of the first pipe 46 is small. In this manner, if the relative displacement between the engine 22 and the aftertreatment device 30 is reduced, the load applied on the first pipe 46 is reduced. Because the load applied on the first pipe 46 can be reduced, the life of the first pipe 46 can be extended, the required number of times of maintenance can be reduced, and durability of the machine can be increased. Especially in cases of a machine in which a traveling device is formed by crawler belts 2 and a machine in which large vibrations are applied to a swinging superstructure 3 (vehicle main body) due to work by a working machine 4 as in the excavator 1 in the embodiment, durability of the device may reduce, even if a pipe having a flexible area is used for the first pipe 46. Even in this case, with the structure in the embodiment, the load applied on the first pipe can be reduced, the required number of times of maintenance can be reduced, and the durability of the device can be improved.

In the embodiment in which the load applied on the first pipe 46 can be reduced, by forming the first pipe 46 as the structure having the flexible area such as the bellows, i.e., by forming the first pipe 46 as the pipe having the mechanism for absorbing displacement due to the vibration, it is possible to suppress occurrence of a failure of the first pipe 46 due to the vibration phase shift between the engine 22 and the aftertreatment device 30 (more specifically, the first treatment section 42). Moreover, it is possible to facilitate connection between the first pipe 46, the engine 22, and the first treatment section 42 in assembly. Although the structure having the flexible area such as the bellows, i.e., the flexible and elastic area which is deformed according to the positional displacement between the both has been described as an example of the mechanism for absorbing the displacement due to the vibration, the mechanism is not limited to it. A mechanism which suffices as the mechanism for absorbing the displacement due to the vibration is a mechanism for preventing transmission of a force, generated by a change in relative positions of the connection between the first pipe 46 and the engine 22 and the connection between the first pipe 46 and the aftertreatment device 30 with respect to each other, to other areas of the first pipe 46.

In the engine unit 20, because the mount mechanism 34 is formed by the upper bracket 62 and the base bracket 60 and the upper bracket 62 supporting the aftertreatment device 30 and the base bracket 60 are fixed to each other by a method such as fastening of bolts so that they can be easily detached from each other, the upper bracket 62 supporting the aftertreatment device 30 can be easily detached from the base bracket 60 at once. By forming the upper bracket 62 for supporting the aftertreatment device 30 as an assembly so that it can be detached easily, it is possible to reduce steps such as detachment of the members one by one in order at the time of maintenance of the machine such as the hydraulic pump 28 disposed below the aftertreatment device 30. Moreover, by forming the upper bracket 62 as the assembly, the upper bracket 62 supporting the aftertreatment device 30 can be assembled in another place and the assembled upper bracket 62 can be mounted to the base bracket 60 in manufacturing the excavator 1 or the engine unit 20. In this way, it is possible to improve work efficiency. Furthermore, by forming the upper bracket 62 as the assembly, the aftertreatment device 30 and the upper bracket 62 of a certain size and in an assembled state can be transported, which makes them easy to carry. As a result, transportability is improved.

In the engine unit 20, because a portion of the base bracket 60 and coupled to the upper bracket 62 is formed in such a shape (the angular U shape in the embodiment) that the hydraulic pump 28 can be seen from above, the hydraulic pump 28 can be seen easily when the upper bracket 62 is detached. In this way, it is possible to carry out maintenance more easily.

In the engine unit 20, by forming the support panel 80 of the upper bracket 62 into the plate shape covering an upper face of the base bracket 60, it is possible to form the support panel 80 as a shielding plate for providing a shield between the hydraulic pump 28 and the aftertreatment device 30. In this manner, by forming a lower face of the upper bracket 62 as the shielding plate, it is possible to prevent the hydraulic oil from spattering on the aftertreatment device 30 even when a pipe or the like around the hydraulic pump 28 breaks and the hydraulic oil spatters around. As a result, it is possible to prevent the hydraulic oil, heated to a high temperature, from spattering on the aftertreatment device 30 to negatively affect it. By forming the shielding plate as a part of the upper bracket 62, the upper bracket 62 can be used as the shielding plate when it is used while mounted to the base bracket 60. At the time of the maintenance, by detaching the upper bracket 62, the hydraulic pump 28 can be maintained. Although the support panel 80 of the upper bracket 62 is preferably in a shape having a function as the shielding plate (a shape for preventing spattering of the hydraulic oil) in order to obtain the above-described effect and to reduce the number of component parts, a shielding plate may be provided separately.

In the engine unit 20, the base bracket 60 of the mount mechanism 34 is coupled to both of the engine support mechanism 32 and the engine 22. By supporting the load applied to the mount mechanism 34 with both of the engine support mechanism 32 and the engine 22, the load can be supported suitably, even if the aftertreatment device 30 is heavy. Exhaust gas treating performance of the aftertreatment device 30 is enhanced basically by increasing the aftertreatment device 30 in size. Therefore, the large aftertreatment device 30 can be used in the engine unit 20 and, as a result, it is possible to more reliably remove nitrogen oxides and particulate matter included in the exhaust gas. In the engine unit 20, by supporting the load applied to the base bracket 60 with both of the engine support mechanism 32 and the engine 22, the load can be spread appropriately and the structure of the base bracket 60 can be further simplified.

Although the base bracket 60 is preferably supported by both of the engine support mechanism 32 and the engine 22 in order to obtain the above-described effects in the engine unit 20, the invention is not limited to it. Although the base bracket 60 may increase in weight due to complication of the structure and increase in plate thickness of material to be used when the aftertreatment device 30 is heavy, the base bracket 60 may be supported only by the engine support mechanism 32. It is also possible that the upper bracket 62 is fixed to another member of the engine as well as to the base bracket 60, though it requires additional steps in the assembly.

In the engine unit 20, the support frame 52 and the support frame 54 of the engine support mechanism 32 extend from the engine rear aide to the engine front side and their end portions on the engine rear side and the engine front side are fixed to the vehicle frame 3c with the vibration absorbing mechanisms 58 interposed therebetween. In other words, in the engine support mechanism 32, the support frame 52 and the support frame 54 for support are coupled, at least at two positions thereof, to the vehicle frame 3c with the vibration absorbing mechanisms 58 interposed therebetween and extend from the engine rear side to the engine front side. In this way, in the engine unit 20, the loads of the aftertreatment device 30 and the mount mechanism 34 can be supported more suitably. In other words, even if a force in a direction away from the engine 22 acts on the aftertreatment device 30 disposed above the support frames 52 and 54 of the engine support mechanism 32, it is possible to appropriately support the aftertreatment device 30. Furthermore, positions where the engine support mechanism 32 is coupled to the vehicle frame 3c with the vibration absorbing mechanisms 58 interposed therebetween are preferably in vicinities of opposite end portions of the engine 22 and/or the opposite end portions of the support frames as in the embodiment. In this way, the load of the engine 22 can be supported appropriately and the aftertreatment device 30 can be supported suitably. The support frames 52 and 54 preferably extend along the crankshaft direction of the engine 22 as in the embodiment. Although the engine support mechanism 32 preferably has the above-described structure, a mechanism which can support the engine 22 suffices. For example, it is possible to employ a structure in which the respective support portions are not coupled or a structure in which the engine is supported only in positions where the vibration absorbing mechanisms 58 are provided and the support frames 52 and 54 and the auxiliary frame 56 are not provided.

Moreover, in the engine unit 20, it is preferable that the lower face of the support panel 80 of the upper bracket 62 and the upper face of the base bracket 60 are in substantially flat shapes. In this way, it is easy to finely adjust positions at the time of positioning of the upper bracket 62 and the base bracket 60 with respect to each other.

In the engine unit 20, it is preferable that the upper bracket 62 supporting the aftertreatment device 30 has a self-standing structure, i.e., such a structure as to be placed at a place (e.g., on the ground) other than the base bracket 60 and not to fall down. As a result, the upper bracket 62 supporting the aftertreatment device 30 becomes easy to treat during transportation and storage.

Moreover, either one of the first treatment section 42 and the second treatment section 44 may be disposed above the other. By disposing the first treatment section 42 above the second treatment section 44, the first treatment section 42 which requires replacement of a filter and the like and more frequent maintenance can be disposed in such a position as to be maintained more easily. By disposing the second treatment section 44 above the first treatment section 42, it is possible to directly couple a pipe from the engine 22 to the first treatment section 42, which enhances workability and saves routing of the pipe. Moreover, by forming the second pipe 48 as the pipe having a flexible area, it is possible to suppress occurrence of a failure of the second pipe 48 even when the vibration phase shift occurs between the first treatment section 42 and the second treatment section 44. It is easy to connect the second pipe 48, the first treatment section 42, and the second treatment section 44 at the time of the assembly.

The upper bracket 62 may be a structure in which the support panel 80, the first support frame 82, the second support frame 84, and the fixing frame 86 are formed integrally or may be a structure in which the plurality of members are fixed by fastening of bolts or welding. Similarly, the base bracket 60 may be a structure in which the base frames 72 and 74 and the coupling frame 76 are formed integrally or may be a structure in which the plurality of members are fixed by fastening of bolts or welding. Furthermore, the base bracket 60 may be a structure integral with the engine support mechanism 32. Although the one end portions of the support frames 52 and 54 are disposed on the engine rear side close to the hydraulic pump 28, they may extend farther to the engine rear side (e.g., vicinities of a rear end portion of the hydraulic pump 28). In this case, fastening (fixing) positions of the base frames 72 and 74 may be provided to the extended end portions only or to the extended end portions and on the engine rear side.

Although the engine unit according to the embodiment is applied to the excavator in the example described in the embodiment, the engine unit can be applied not only to the excavator but also to any engine unit having an aftertreatment device. For example, the engine unit according to the embodiment can be applied to construction machines and earthmoving machines in general such as a grader, a wheel loader, a bulldozer, and a dump truck and is especially suitable when an installation area is limited.

(Variation)

Figure 11:
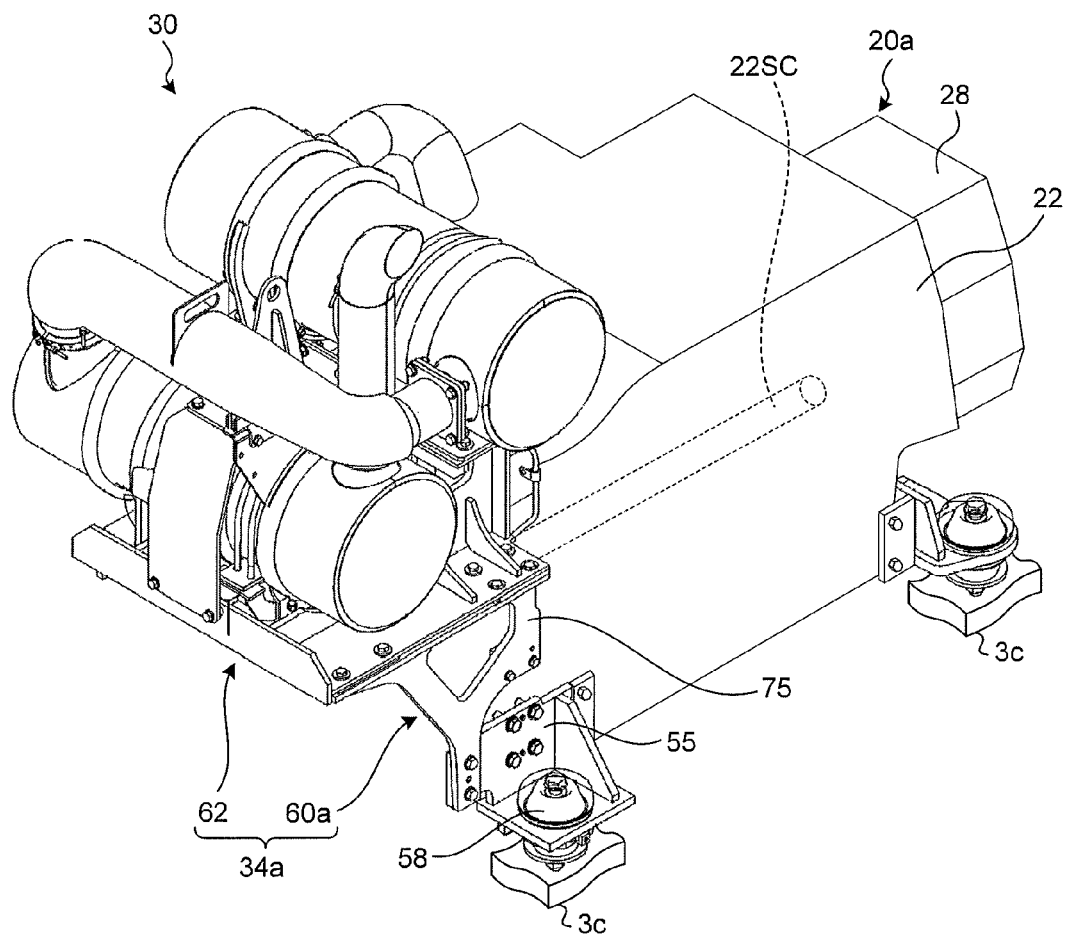
FIG. 11 is a perspective view illustrating a schematic structure of an engine unit according to a variation.
Figure 12:
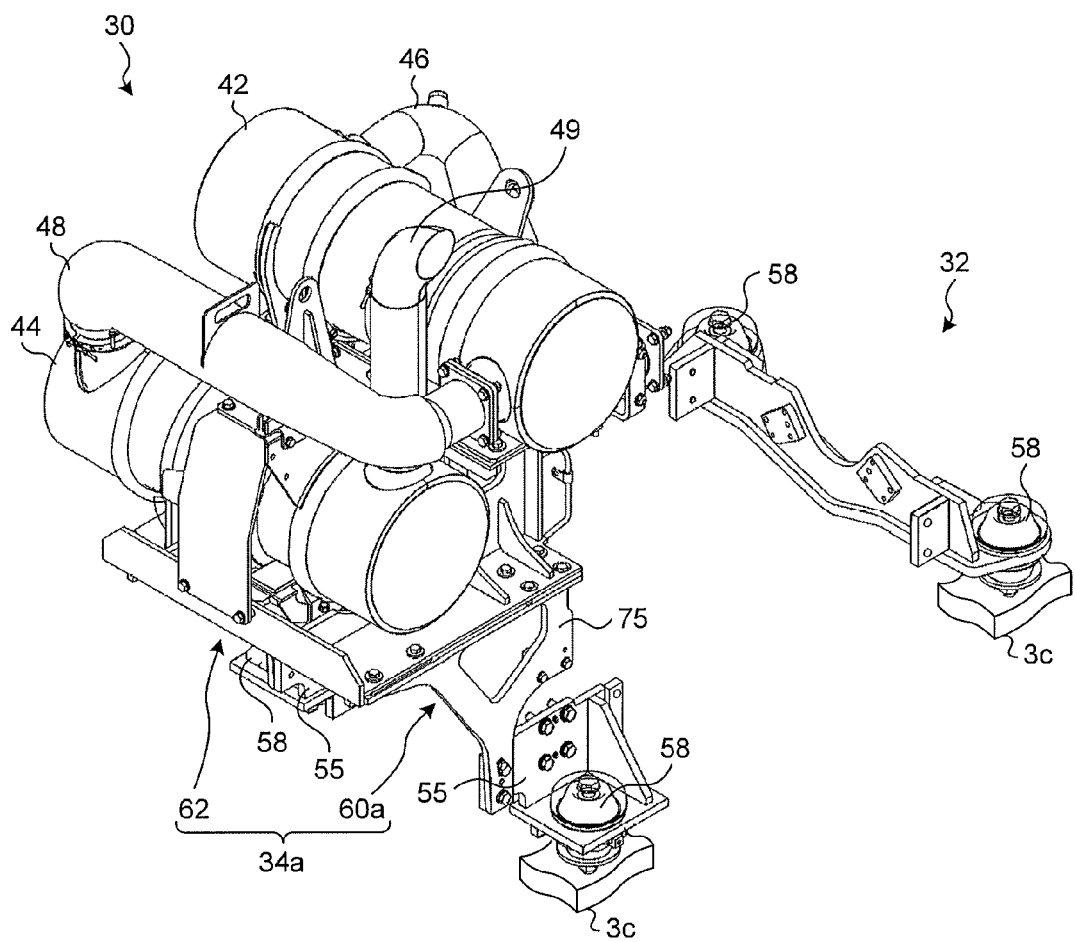
FIG. 12 is a perspective view illustrating schematic structures of an engine support mechanism and a mount mechanism according to the variation.
Figure 13:
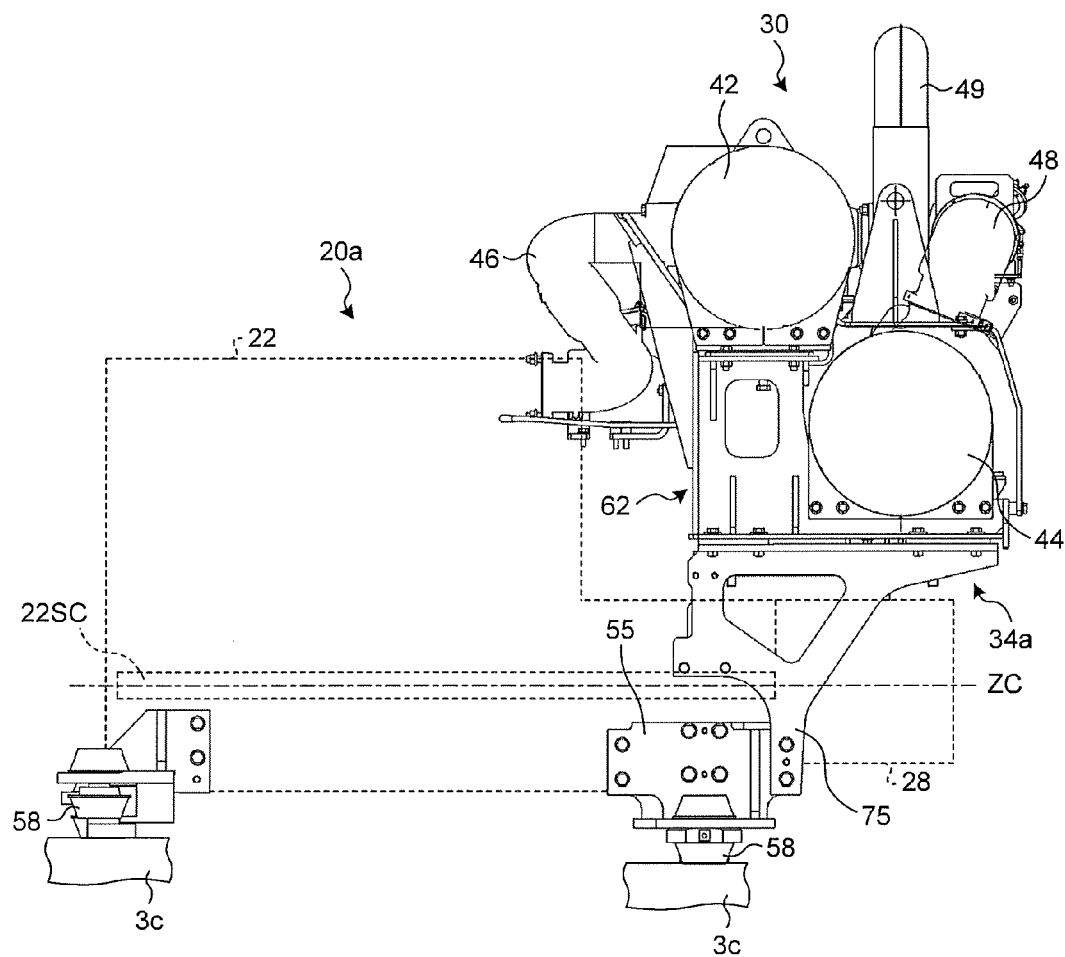
FIG. 13 is a side view of the engine support mechanism and the mount mechanism according to the variation.

FIG. 11 is a perspective view illustrating a schematic structure of an engine unit according to a variation. FIG. 12 is a perspective view illustrating schematic structures of an engine support mechanism and a mount mechanism according to the variation. FIG. 13 is a side view of an engine support mechanism and the mount mechanism according to the variation. The variation is similar to the above-described embodiment except that a base bracket 60a of a mount mechanism 34a is provided to an engine mount 55 as an engine support mechanism disposed on one end side of the engine 22 in a direction in which a crankshaft extends and that the base bracket 60a and the engine mount 55 are shared. Because other structures are similar to those in the above-described embodiment, the common structures are provided with the same reference numerals.

An engine unit 20a in the variation is applied to a grader, for example. The grader is a wheeled earthmoving machine mainly for shaving a road surface, the ground, or the like flat or leveling it to shape it. The grader is equipped with a blade, a scarifier, or the like as a working device. The grader has advantages that finishing accuracy is high, that it can travel on a general road, and that traveling speed is relatively high.

As illustrated in FIG. 11, the engine 22 is mounted to the engine mounts 55. The engine mounts 55 are mounted to a vehicle frame 3c with vibration absorbing mechanisms 58 interposed therebetween. With this structure, the engine 22 is mounted to the vehicle frame 3c with the engine mounts 55 and the vibration absorbing mechanisms 58 interposed therebetween. The vibration absorbing mechanisms 58 are respectively disposed on opposite sides of the engine 22 in a direction orthogonal to a crankshaft 22SC of the engine 22 and on a side of an aftertreatment device 30. On the side of the aftertreatment device 30, the vibration absorbing mechanisms 58 are disposed on one end portion side of the crankshaft 22SC. In the variation, the two vibration absorbing mechanisms 58 on the side of the aftertreatment device 30 (one on each side of the engine 22) and the two vibration absorbing mechanisms 58 on the opposite side from the aftertreatment device 30 (i.e., on the other end portion side of the crankshaft 22SC) (one on each side of the engine 22), i.e., the four vibration absorbing mechanisms 58 are disposed in total.

In the variation, the hydraulic pump 28 is disposed on the opposite side of the engine 22 from the aftertreatment device 30. In other words, the aftertreatment device 30 is disposed on one side of the crankshaft 22SC and the hydraulic pump 28 is disposed on the other side of the crankshaft 22SC. A position where the hydraulic pump 28 is disposed is not limited to this example.

As illustrated in FIGS. 11 to 13, the base bracket 60a which is a part of the mount mechanism 34a is provided to the engine mounts 55 which are engine support mechanisms. To put it concretely, base frames 75 of the base bracket 60a are provided to the engine mounts 55. In the variation, one engine mount 55 is provided on each of right and left sides of the engine 22 (i.e., two in total). Therefore, the base bracket 60a has one base frame 75 for each of the engine mounts 55, i.e., the two base frames 75 in total. As illustrated in FIGS. 11 to 13, the upper bracket 62 which is a part of the mount mechanism 34a is detachably fixed and mounted to the base bracket 60a to support the aftertreatment device 30.

As illustrated in FIG. 13, each of the base frames 75 extends from a side of the engine mount 55 which is the engine support mechanism toward the upper bracket 62 and extends in a direction away from the engine and in parallel to a rotation central axis ZC of the crankshaft 22SC of the engine 22. Each of the base frames 75 is supported on one side on the engine mount 55. By extending each of the base frames 75 in such a direction away from the engine 22 and toward the upper bracket 62, i.e., toward an upper side of the engine 22, it is possible to dispose a power take off (PTO) of the crankshaft 22SC of the engine 22 between the paired base frames 75. Because the aftertreatment device 30 is mounted to the upper bracket 62, it is possible to dispose the power take off of the crankshaft 22SC below the aftertreatment device 30. As a result, auxiliary machines or an optionally provided power transmission mechanism for all-wheel drive and the like can be disposed between the paired base frames 75 and below the aftertreatment device 30, which increases a degree of freedom in layout in the construction machine such as a grader. In the above-described embodiment, as illustrated in FIG. 3, the hydraulic pump 28 is disposed below the aftertreatment device 30.

In the variation, the base bracket 60a and the engine mounts 55 are respectively manufactured as separate members and are coupled to each other by fastening members such as bolts. The variation is not limited to this structure. For example, the base bracket 60a may be integrated with the engine mounts 55 by means of casting or joining of a plurality of parts by welding. In this case, the base frames 75 of the base bracket 60a and the engine mounts 55 may be integrated by casting, for example. Then, at least a set of the base frame 75 and the engine mount 55 manufactured integrally is disposed on each side of the engine 22. The engine mounts 55 mount the engine unit 20 to the vehicle frame 3c with the vibration absorbing mechanisms 58 interposed therebetween. In this manner, in the variation, the base frames 75 or the base bracket 60a and the engine mounts 55 may be made detachable by coupling separated parts by bolts or the like or may be manufactured integrally by casting or the like. In other words, the base bracket 60a may be fixed to the engine mounts 55 or may include the engine mounts 55.

The base bracket 60a and the upper bracket 62 may be integrated with the engine mounts 55 by means of casting or joining a plurality of parts by welding or the like. Furthermore, the base bracket 60a, the engine mounts 55, and the upper bracket 62 may be integrated with the engine mounts 55 by means of casting or joining a plurality of parts by welding or the like. In this way, it is possible to reduce the number of parts.

In the engine unit 20a in the variation, the mount mechanism 34a supporting the aftertreatment device 30 is supported by the engine 22 and the engine mounts 55. In this way, the engine 22 and the aftertreatment device 30 can belong to the same vibration system in the engine unit 20a. As a result, it is possible to suppress occurrence of a vibration phase shift between the engine 22 and the aftertreatment device 30 to thereby reduce a load applied on the first pipe 46 connecting the engine 22 and the aftertreatment device 30. In other words, in a structure with a vibration absorbing mechanism disposed between the engine 22 and the aftertreatment device 30, the engine 22 and the aftertreatment device 30 belong to different vibration systems and vibrations of the engine 22 and the aftertreatment device 30 are out of phase with each other, which increases a relative displacement between positions of opposite ends of the first pipe 46. If the relative displacement increases, the load applied on the first pipe 46 increases.

On the other hand, in the engine unit 20a, because the vibration absorbing mechanism is not disposed between the engine 22 and the aftertreatment device 30 and the members between the engine 22 and the aftertreatment device 30, i.e., the engine mounts 55 and the mount mechanism 34a in the variation are fixed. Therefore, in the engine unit 20a, the engine 22 and the aftertreatment device 30 belong to the same vibration system and the engine 22 and the aftertreatment device 30 vibrate together. As a result, the relative displacement between positions of the opposite ends of the first pipe 46 is small. In this manner, if the relative displacement between the engine 22 and the aftertreatment device 30 is reduced, the load applied on the first pipe 46 is reduced.

In this manner, because the load applied on the first pipe 46 can be reduced in the engine unit 20a, the life of the first pipe 46 can be extended, the required number of times of maintenance can be reduced, and durability of the machine can be increased. Especially a vehicle such as a grader which travels on unpaved roads is liable to receive vibrations and shocks and therefore durability of the device may reduce even if a pipe having a flexible area is used for the first pipe 46. In this case, with the structure according to the variation, the load applied on the first pipe 46 can be reduced, the required number of times of maintenance can be reduced, and durability of the device can be increased.

Because the construction machine or the earthmoving machine is often used in unpaved places such as rough terrains and therefore larger vibrations are frequently applied to the engine unit than in the vehicle traveling on pavements. Therefore, the effects of the embodiment can be more suitably exerted on the construction machine or the earthmoving machine. Because the excavator or the grader has a more severely limited installation area for the engine unit, the effects of the embodiment and the variation can be more suitably exerted on it.

REFERENCE SIGNS LIST 1 excavator
2 crawler belt
3 swinging superstructure
3a cabin
3b counterweight
3c vehicle frame
4 working machine
4a boom
4b arm
4c bucket
12 engine room
14 intake system
16 hydraulic oil tank
17 hydraulic machine section
18 working machine base section
19 fuel tank
20, 20a engine unit
22 engine
24 cooling system
28 hydraulic pump
30 aftertreatment device
32 engine support mechanism
34, 34a mount mechanism
42 first treatment section
44 second treatment section
46 first pipe
48 second pipe
49 exhaust pipe
52, 54 support frame
55 engine mount
56 auxiliary frame
58 vibration absorbing mechanism
60, 60a base bracket
62 upper bracket
72, 74, 75 base frame
76 coupling frame
78 engine coupling portion
80 support panel
82 first support frame
84 second support frame
86 fixing frame

The invention claimed is:

1. An engine unit mounted to a vehicle frame, the engine unit comprising:
an engine;
an aftertreatment device to purify exhaust gas emitted from the engine;
an engine support mechanism to be coupled to the vehicle frame, with vibration absorbing mechanisms respectively disposed on both sides of the engine in an orthogonal direction to a crankshaft of the engine and on a side of the aftertreatment device, to support the engine;
a base bracket provided to the engine support mechanism; and
an upper bracket detachably fixed and mounted to the base bracket, the upper bracket supporting the aftertreatment device,
wherein the base bracket has a base frame which extends in such a direction from a side of the engine support mechanism toward the upper bracket, and away from the engine in a parallel direction to a rotation central axis of the crankshaft of the engine, and which is supported on one end by the engine support mechanism,
wherein the base bracket is fixed to both the engine and the engine support mechanism, and
wherein the engine support mechanism, the base frame, the upper bracket, and the aftertreatment device are disposed at a same end side in an extending direction of the crankshaft of the engine.

2. The engine unit according to claim 1,
wherein the engine support mechanism has an engine mount mounted to the engine and coupled to the vehicle frame with the vibration absorbing mechanisms, and the base bracket is fixed to the engine mount.

3. The engine unit according to claim 1,
wherein the engine support mechanism has an engine mount mounted to the engine and coupled to the vehicle frame with the vibration absorbing mechanisms, and the base bracket includes the engine mount.

4. The engine unit according to claim 1, wherein a pipe of the aftertreatment device coupled to the engine, the pipe guiding the exhaust gas emitted from the engine, has a mechanism for absorbing a displacement due to a vibration.

5. The engine unit according to claim 1, wherein the aftertreatment device includes a first treatment section for collecting particulate matter included in the exhaust gas and a second treatment section for reducing nitrogen oxides included in the exhaust gas.

6. The engine unit according to claim 5, wherein the second treatment section is disposed on an upper side of the first treatment section in a vertical direction.

* * * * *